United States Patent
Kanno

(10) Patent No.: US 8,508,076 B2
(45) Date of Patent: Aug. 13, 2013

(54) WIRELESS POWER TRANSMISSION UNIT AND POWER GENERATOR AND POWER GENERATION SYSTEM WITH THE WIRELESS POWER UNIT

(75) Inventor: Hiroshi Kanno, Osaka (JP)

(73) Assignee: Panasonic Corporation, Osaka (JP)

( * ) Notice: Subject to any disclaimer, the term of this patent is extended or adjusted under 35 U.S.C. 154(b) by 413 days.

(21) Appl. No.: 12/853,351

(22) Filed: Aug. 10, 2010

(65) Prior Publication Data

US 2011/0037322 A1   Feb. 17, 2011

Related U.S. Application Data

(60) Provisional application No. 61/233,531, filed on Aug. 13, 2009.

(51) Int. Cl.
*H01F 27/42* (2006.01)
*H01F 37/00* (2006.01)
*H01F 38/00* (2006.01)

(52) U.S. Cl.
USPC .............. 307/104; 343/745; 343/749

(58) Field of Classification Search
USPC ........................................... 307/104
See application file for complete search history.

(56) References Cited

U.S. PATENT DOCUMENTS

| | | | |
|---|---|---|---|
| 5,522,943 A * | 6/1996 | Spencer et al. | 136/245 |
| 6,160,374 A | 12/2000 | Hayes et al. | |
| 6,889,905 B2 | 5/2005 | Shigemasa et al. | |
| 7,049,935 B1 | 5/2006 | Wuidart et al. | |
| 2004/0095291 A1 | 5/2004 | Shigemasa et al. | |
| 2008/0278264 A1 | 11/2008 | Karalis et al. | |

(Continued)

FOREIGN PATENT DOCUMENTS

DE   11 2006 002 299 T5   6/2008
EP   1 420 357 A1   5/2004

(Continued)

OTHER PUBLICATIONS

Co-pending U.S. Appl. No. 13/267,033, filed Oct. 6, 2011.

(Continued)

*Primary Examiner* — Rexford Barnie
*Assistant Examiner* — Toan Vu
(74) *Attorney, Agent, or Firm* — Renner, Otto, Boisselle & Sklar, LLP

(57) ABSTRACT

A wireless power transmission unit includes an oscillator for converting DC energy into RF energy having a frequency f0 and a first antenna for transmitting the RF energy. The first antenna includes a first inductor and a first capacitor that are connected together in series to form a series resonant circuit with a resonant frequency fT. The unit further includes a second antenna for receiving, by resonant magnetic coupling, at least a part of the RF energy that has been transmitted by the first antenna. The second antenna includes a second inductor and a second capacitor that are connected in parallel with each other to form a parallel resonant circuit with a resonant frequency fR. The resonant frequencies fT and fR are set to be substantially equal to the frequency f0 of the RF energy, the oscillator has a voltage step-up ratio Voc, the first inductor has an inductance L1, the second inductor has an inductance L2, the second inductor is coupled with the first inductor by a resonant magnetic field at a coupling coefficient k which is set to be less than 0.5, and the power transmission unit satisfies $(L2/L1) \geq 4(k/Voc)^2$.

25 Claims, 12 Drawing Sheets

(56) References Cited

U.S. PATENT DOCUMENTS

| | | | |
|---|---|---|---|
| 2010/0033156 A1* | 2/2010 | Abe et al. | 323/305 |
| 2010/0109445 A1* | 5/2010 | Kurs et al. | 307/104 |
| 2010/0181837 A1* | 7/2010 | Seeker et al. | 307/72 |
| 2010/0207572 A1* | 8/2010 | Kirby et al. | 320/101 |
| 2010/0244579 A1* | 9/2010 | Sogabe et al. | 307/104 |

FOREIGN PATENT DOCUMENTS

| | | |
|---|---|---|
| JP | 11-075329 | 3/1999 |
| JP | 11-338983 | 12/1999 |
| JP | 2001-0 86030 | 3/2001 |
| JP | 2004-166384 | 6/2004 |
| JP | 2006-136045 | 5/2006 |

OTHER PUBLICATIONS

International Search Report for corresponding International Application No. PCT/JP2010/063889 mailed Jul. 12, 2011.

Form PCT/ISA/237 for International Application No. PCT/JP2010/063889 dated Jul. 12, 2011.

\* cited by examiner (a)

(b)

WIRELESS POWER TRANSMISSION UNIT AND POWER GENERATOR AND POWER GENERATION SYSTEM WITH THE WIRELESS POWER UNIT

This application claims priority under 35 USC §119(e) to U.S. Provisional Application No. 61/233,531 filed on Aug. 13, 2009, the entire contents of which are incorporated herein by reference.

BACKGROUND OF THE INVENTION

1. Field of the Invention

The present invention relates to a magnetic resonant coupling wireless power transmission unit for transmitting power wirelessly using magnetic resonant coupling instead of electromagnetic induction or electromagnetic wave propagation. The present invention also relates to a power generator and power generation system for raising the voltage of electric energy, which has been generated by a power generating section such as a solar cell, by magnetic resonant coupling wireless power transmission.

2. Description of the Related Art

A solar power generation system ordinarily uses a so-called "solar cell module" in which a very large number of solar cells (which will be simply referred to herein as "cells") are arranged inside a metallic frame and connected together. A glass plate is arranged in front of the solar cell module (which will be simply referred to herein as a "module") so that the respective cells operate without being exposed to the air. And by assembling a number of such solar cell modules together, a solar power generation system can be established.

Use of such a solar power generation system, however, has not been widespread yet because the cost of manufacturing those cells and modules is too high, which is one of the major obstacles to its introduction. On top of that, the cost of establishing such a system by installing those cells and modules is also too high to neglect. Among other things, the higher the altitude of the place of installation, the riskier and the more expensive the installation work will be, which is a serious problem to overcome in order to further popularize the solar power generation system. What is more, to introduce a solar power generation system into an existing building, it is difficult to install the wiring connecting the solar power generating section outside of the building to electronic devices inside of the building, which is also one of the big problems with conventional solar power generation systems.

As will be described later, in a conventional solar power generation system, the output voltage of each of its cells is so low that a great many solar cells should be connected together to obtain a voltage that is high enough to operate an electronic device. And a decrease in reliability at such a very large number of connection points is a decisive factor in the decline of the long-term reliability of the overall system. In addition, if those modules and cables deteriorate with a long-term use, their replacements should also be installed at such a height. Consequently, the cost of maintenance is also non-negligible.

As a conventional solar power generator that would overcome such problems, a power supply system for supplying energy wirelessly from outside of a building and through the walls of the building has been proposed (see Japanese Patent Application Laid-Open Publication No. 2006-136045 (Embodiment 5 and FIG. 16), for example). Such a power supply system transmits RF (radio frequency) energy through the walls by electromagnetic induction.

On the other hand, United States Patent Application Publication No. 2008/0278264 (FIGS. 12 and 14) discloses a new type of wireless energy transfer system for transferring energy from one of two resonators to the other, and vice versa, through the space between them. The wireless energy transfer system couples the two resonators with each other via the evanescent tail of the oscillation energy of the resonant frequency that is produced in the space surrounding those two resonators, thereby transferring the oscillation energy wirelessly (i.e., by a non-contact method).

The power supply system disclosed in Japanese Patent Application Laid-Open Publication No. 2006-136045, however, cannot overcome the solar power generation device's own problem that the output voltage of each cell is low. In the field of solar power generation, a crystalline silicon based solar cell, which is currently used broadly due to its high energy conversion efficiency, has an output voltage Vc of just about 0.5 V. For example, if the DC output of a solar power generating section needs to be converted into AC power, the operation efficiency of a normal power conditioner is maximized in response to an input voltage of approximately 300 Vdc. That is why to get that conversion done with high efficiency, the output voltage of the solar power generating section should be increased to the vicinity of 300 V by connecting as many as several hundreds of cells together in series. On the other hand, if connected to a three-wire single-phase grid system (with a working voltage of 100 V or 200 V), which is a normal household wiring system, the solar power generating section may have its output voltage increased by a power conditioner as much as 200 fold or more. Considering the decrease in power efficiency to be caused by increasing the voltage that much, it is still preferred that a very large number of cells be connected together in series to increase the output voltage of the solar power generating section as much as possible.

It should be noted that even if the DC voltage is not converted into AC power within such a solar power generation system, a similar problem will also arise. For example, in a DC power supply system that has attracted a lot of attention these days, its working voltage will be either 48 Vdc or within the range of 300 to 400 Vdc. That is why even when solar energy needs to be supplied to a DC power supply system, several tens to several hundreds of solar cells also need to be connected together in series.

However, the greater the number of cells or modules to be connected together in series, the more easily the overall performance of the system will decline due to either so-called "partial shading" (i.e., some of the installation zone goes into the shade) or deterioration in the property of some of those cells or modules to be installed. To overcome such a problem, normally a countermeasure such as introduction of a bypass diode into each module is taken. Such a measure is not preferred because an excessive quantity of heat will be generated or the cost will rise significantly in that case. Meanwhile, even when the voltage needs to be increased using a normal DC/DC converter with a voltage boosting function, it is also difficult to achieve a voltage step-up ratio that is high enough to significantly reduce the number of cells to be connected together in series.

Also, the voltage boosting ability of the wireless energy transfer system disclosed in United States Patent Application Publication No. 2008/0278264 is limited to what should be realized by conventional transformer technology and is not sufficiently effective to overcome those problems to be solved by the present invention.

SUMMARY OF THE INVENTION

A preferred embodiment of the present invention is provided in order to overcome the aforementioned problems in conventional systems and it is therefore an object of the present invention to provide a wireless power transmission unit that can increase a low output voltage of a power generating section effectively.

A wireless power transmission unit according to the present invention includes: an oscillator for converting DC energy into RF energy having a frequency f0; a first antenna, which transmits the RF energy and which includes a first inductor and a first capacitor that are connected together in series to form a series resonant circuit with a resonant frequency fT; and a second antenna, which receives, by coupling a resonant magnetic field, at least a part of the RF energy that has been transmitted by the first antenna and which includes a second inductor and a second capacitor that are connected in parallel with each other to form a parallel resonant circuit with a resonant frequency fR. The resonant frequencies fT and fR are set to be substantially equal to the frequency f0 of the RF energy. Supposing the oscillator has a voltage step-up ratio Voc, the first inductor has an inductance L1, the second inductor has an inductance L2, and the first and second antennas have a coupling coefficient k, the power transmission unit satisfies $(L2/L1) \geq 4(k/Voc)^2$.

A power generator according to the present invention includes: a power generating section for outputting DC energy; and a wireless power transmission unit, which is connected to the power generating section. The wireless power transmission unit includes: an oscillator for converting DC energy into RF energy having a frequency f0; a first antenna, which transmits the RF energy and which includes a first inductor and a first capacitor that are connected together in series to form a series resonant circuit with a resonant frequency fT; and a second antenna, which receives, by coupling a resonant magnetic field, at least a part of the RF energy that has been transmitted by the first antenna and which includes a second inductor and a second capacitor that are connected in parallel with each other to form a parallel resonant circuit with a resonant frequency fR. The resonant frequencies fT and fR are set to be substantially equal to the frequency f0 of the RF energy. Supposing the oscillator has a voltage step-up ratio Voc, the first inductor has an inductance L1, the second inductor has an inductance L2, and the first and second antennas have a coupling coefficient k, the power generator satisfies $(L2/L1) \geq 4(k/Voc)^2$.

In one preferred embodiment, the power generating section is a solar power generating section.

In this particular preferred embodiment, the solar power generating section uses crystalline silicon.

In another preferred embodiment, when an output terminal of the second antenna is connected to a load that follows the second antenna, the output impedance Zoc of the oscillator and the input impedance Zin of the first antenna are substantially equal to each other.

In still another preferred embodiment, when an output terminal of the oscillator is connected to an input terminal of the first antenna, the output impedance Zout of the second antenna is substantially equal to the input impedance of a load that follows the second antenna.

In yet another preferred embodiment, $(L2/L1) \geq 100 \times (k/Voc)^2$ is satisfied.

In yet another preferred embodiment, $(L2/L1) \geq 10000 \times (k/Voc)^2$ is satisfied.

In yet another preferred embodiment, the power generating section and the first antenna are arranged outside of a building, and the second antenna is installed inside of the building.

In yet another preferred embodiment, the first and second inductors both have an air-core spiral structure.

In yet another preferred embodiment, L1<L2 is satisfied.

In yet another preferred embodiment, the number N2 of turns of the second inductor is greater than the number N1 of turns of the first inductor.

In yet another preferred embodiment, the area of the second inductor is larger than that of the first inductor.

In this particular preferred embodiment, when the first and second inductors are projected onto the first antenna's arrangement plane, the first inductor is included within an area defined by the projected profile of the second inductor.

In this particular preferred embodiment, when the first and second inductors are projected onto the first antenna's arrangement plane, the first inductor is located close to the periphery of an area defined by the projected profile of the second inductor.

Another wireless power transmission unit according to the present invention includes: an oscillator for converting DC energy into RF energy having a frequency f0; a first antenna, which transmits the RF energy and which includes a first inductor and a first capacitor that are connected together in series to form a series resonant circuit with a resonant frequency fT; a second antenna, which receives, by coupling a resonant magnetic field, at least a part of the RF energy that has been transmitted by the first antenna and which includes a second inductor and a second capacitor that are connected in parallel with each other to form a parallel resonant circuit with a resonant frequency fR; and a rectifier for converting the RF energy supplied from the second antenna into DC energy. The resonant frequencies fT and fR are set to be substantially equal to the frequency f0 of the RF energy. Supposing the oscillator has a voltage step-up ratio Voc, the rectifier has a voltage step-up ratio Vrr, the first inductor has an inductance L1, the second inductor has an inductance L2, and the first and second antennas have a coupling coefficient k, the power transmission unit satisfies $(L2/L1) \geq 4(k/(Voc \times Vrr))^2$.

Another power generator according to the present invention includes: a power generating section for outputting DC energy; and a wireless power transmission unit, which is connected to the power generating section. The wireless power transmission unit includes: an oscillator for converting the DC energy into RF energy having a frequency f0; a first antenna, which transmits the RF energy and which includes a first inductor and a first capacitor that are connected together in series to form a series resonant circuit with a resonant frequency fT; a second antenna, which receives, by coupling a resonant magnetic field, at least a part of the RF energy that has been transmitted by the first antenna and which includes a second inductor and a second capacitor that are connected in parallel with each other to form a parallel resonant circuit with a resonant frequency fR; and a rectifier for converting the RF energy supplied from the second antenna into DC energy. The resonant frequencies fT and fR are set to be substantially equal to the frequency f0 of the RF energy. Supposing the oscillator has a voltage step-up ratio Voc, the rectifier has a voltage step-up ratio Vrr, the first inductor has an inductance L1, the second inductor has an inductance L2, and the first and second antennas have a coupling coefficient k, the power generator satisfies $(L2/L1) \geq 4(k/(Voc \times Vrr))^2$.

In one preferred embodiment, the power generating section is a solar power generating section.

In another preferred embodiment, when an output terminal of the rectifier is connected to a load that follows the rectifier, the output impedance Zoc of the oscillator and the input impedance Zin of the first antenna are substantially equal to each other.

In still another preferred embodiment, when an output terminal of the oscillator is connected to an input terminal of the first antenna, the output impedance Zout of the rectifier is substantially equal to the input impedance of a load that follows the rectifier.

In yet another preferred embodiment, $(L2/L1) \geqq 100 \times (k/(Voc \times Vrr))^2$ is satisfied.

In yet another preferred embodiment, $(L2/L1) \geqq 2304 \times (k/Voc)^2$ is satisfied.

In yet another preferred embodiment, $(L2/L1) \geqq 10000 \times (k/Voc)^2$ is satisfied.

In yet another preferred embodiment, the rectifier is a voltage doubler rectifier circuit with a voltage step-up ratio Vrr of at least two.

A power generation system according to the present invention includes a number of power generators. In at least two of the power generators, their output terminals are connected in parallel with each other. And the at least two power generators are as defined in any of the preferred embodiments of the present invention described above.

A wireless power transmission unit according to a preferred embodiment of the present invention can increase the voltage significantly in transmitting power between antennas using magnetic resonant coupling. Also, a power generator and power generation system in accordance with other preferred embodiments of the present invention can transmit energy wirelessly by way of the space between the antennas (i.e., by a non-contact method). Thus, according to the present invention, the energy generated by a power generating section that is arranged outside of a building can be transferred to an electronic device inside of that building at an increased voltage. According to a preferred embodiment of the present invention, the cost of installing the power generator can be reduced and the job of replacing a deteriorated part of the power generating section can be done more easily.

On top of that, according to another preferred embodiment of the present invention, the output voltage of the power generating section can be increased easily. That is why if the power generating section is made up of power generators (e.g., solar cells) with a low output voltage, the number of those power generators to be connected together can be reduced significantly. Consequently, if a solar power generation system is formed by connecting power generators according to a preferred embodiment of the present invention together in parallel, the deterioration due to the partial shading can be minimized and power can be supplied with good stability.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 12(a) is a circuit diagram illustrating a half-wave voltage doubler rectifier circuit for use in the power generator as the second preferred embodiment of the present invention, while FIG. 12(b) is a circuit diagram illustrating a full-wave voltage doubler rectifier circuit for also use in the second preferred embodiment.

DETAILED DESCRIPTION OF PREFERRED EMBODIMENTS

Before preferred embodiments of a wireless power transmission unit and a power generator according to the present invention are described, the fundamental arrangement of the present invention will be described with reference to FIGS. 1 through 6.

Figure 1:
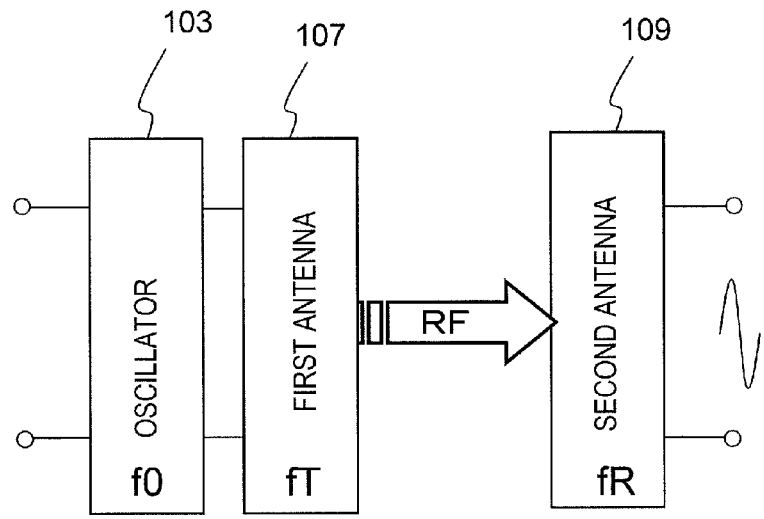
FIG. 1 illustrates a fundamental arrangement for a wireless power transmission unit according to the present invention.

FIG. 1 illustrates a fundamental arrangement for a wireless power transmission unit according to the present invention. In this example, the wireless power transmission unit includes an oscillator 103 with an oscillation frequency f0, a first antenna with a resonant frequency fT, and a second antenna 109 with a resonant frequency fR. Both of these resonant frequencies fT and fR are set to be equal to the frequency f0, which may fall within the range of 50 Hz to 300 GHz and preferably falls within the range of 100 kHz to 10 GHz, more preferably within the range of 500 kHz to 20 MHz. According to the intended use, the frequency f0 could also fall within either the range of 10 kHz to 1 GHz or the range of 20 kHz to 20 MHz.

The oscillator 103 receives DC energy (i.e., power) and converts that DC energy into RF energy having the frequency f0 (which will be referred to herein as a "DC-RF conversion"). Next, the RF energy is supplied from the oscillator 103 to the first antenna 107, which is connected to the oscillator 103. The first and second antennas 107 and 109, which are designed so as to have the same resonant frequency, are coupled together by the resonant magnetic field produced by their resonators. The second antenna 109 can receive at least a part of the RF energy that has been transmitted by the first antenna 107. The second antenna 109 is not in contact with the first antenna 107 but is located at a distance of several millimeters to several meters from the first antenna 107.

In the wireless power transmission unit of the present invention, the "antenna" is an element for transferring energy from one of two objects to the other by using a coupling phenomenon that has been produced by the evanescent tail of the electromagnetic field of the resonator. According to such a wireless power transmitting technique that uses the resonant electromagnetic field, energy loss, which would otherwise be caused when an electromagnetic wave is transferred to a distant location, will not be caused, and therefore, the power can be transmitted with very high efficiency. Such an energy transmitting technique that uses the coupling phenomenon of a resonant electromagnetic field (i.e., a near field) will cause much less loss than a known non-contact power transmission that uses the Faraday's law of electromagnetic induction. For example, in a preferred embodiment of the present invention, energy can be transmitted between two resonators (or antennas), which have an interval of as much as several meters between them.

To carry out a wireless power transmission based on such a principle, coupling by magnetic resonant coupling needs to be produced between two resonant antennas. As described above, according to the present invention, the resonant frequencies fT and fR are both set equal to the frequency f0 of the oscillator 103. However, fT and fR do not have to be exactly equal to, but may be substantially equal to, f0. That is to say, neither fT nor fR needs to completely agree with f0. To transfer energy with high efficiency by taking advantage of the coupling phenomenon between the two resonators, ideally fT=fR should be satisfied, but there is minimal loss as long as there is only a little difference between fT and fR. Therefore, it is defined in the present application that the frequency fT is equal to the frequency fR if the following inequality (1) is satisfied:

$$|fT-fR| \leq fT/QT + fR/QR \tag{1}$$

where QT is the Q factor of the first antenna as a resonator and QR is the Q factor of the second antenna as a resonator. In general, if the resonant frequency is identified by X and the Q factor of a resonator is identified by Qx, a frequency range in which that resonator produces resonance is obtained by X/Qx. If this inequality $|fT-fR| \leq fT/QT + fR/QR$ is satisfied, energy can be transferred between the two resonators by magnetic resonant coupling.

Figure 2:
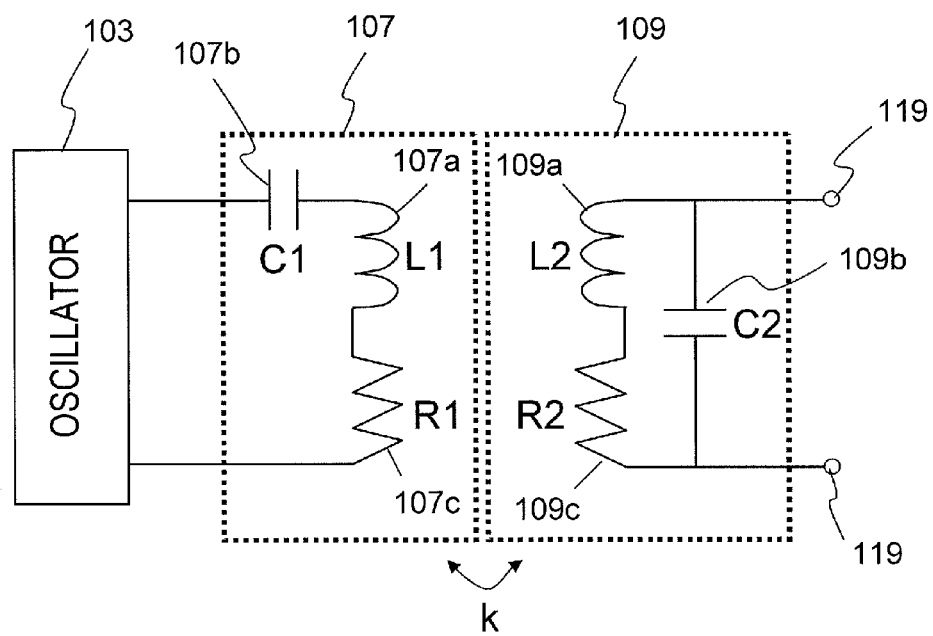
FIG. 2 illustrates an equivalent circuit for antennas in the wireless power transmission unit of the present invention.

Next, reference is made to FIG. 2 which illustrates an equivalent circuit for the first and second antennas 107 and 109. As shown in FIG. 2, according to the present invention, the first antenna 107 is a series resonant circuit in which a first inductor 107a and a first capacitor 107b are connected together in series, while the second antenna 109 is a parallel resonant circuit in which a second inductor 109a and a second capacitor 109b are connected together in parallel. The series resonant circuit of the first antenna 107 has a parasitic resistance component R1 and the parallel resonator of the second antenna 109 has a parasitic resistance component R2.

According to the present invention, if Voc represents the voltage step-up ratio of the oscillator 103, L1 and L2 represent the inductances of the first and second inductors 107a and 109a, respectively, and k represents the coupling coefficient of the first and second antennas 107 and 109, these L1, L2, k and Voc values are determined so as to satisfy the following inequality:

$$(L2/L1) \geq 4(k/Voc)^2$$

If this relation is satisfied, the voltage of the RF energy output by wireless power transmission can be at least twice as high as that of the DC energy input. That is to say, a voltage step-up ratio of at least two can be achieved. It will be described in detail later exactly why the voltage can be increased that much. In this description, the "voltage step-up ratio" is defined to be a voltage ratio of the energy to be output from one circuit block (or a group of circuit blocks including that circuit block) in a system to the energy that has been input to that circuit block. For example, when an input DC voltage is increased to an effective AC voltage of ±Vac, the step-up ratio will be Vac/Vdc. A circuit block here represents each element such as a power generating section 101, an oscillator 103, a first second antenna 107, a second antenna 109, or a rectifier 115.

The wireless power transmission unit of the present invention can increase the voltage of the energy (or power) with a low voltage efficiently while the power is being transmitted wirelessly.

Figure 3:
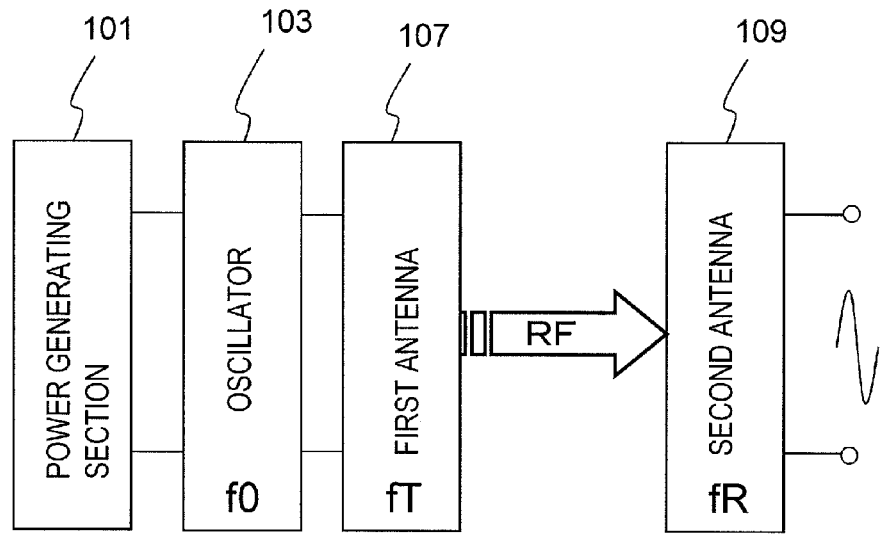
FIG. 3 illustrates a configuration for a power generator according to the present invention.

FIG. 3 illustrates a configuration for a power generator according to the present invention. This power generator includes the wireless power transmission unit shown in FIG. 1 and a power generating section 101 that supplies DC energy to the oscillator 103 of the wireless power transmission unit. Even if the output voltage of the power generating section 101 is low, the power generator of the present invention can still output power with a high voltage thanks to the voltage increase effect. Consequently, the power generator of the present invention can efficiently increase the voltage of low-voltage energy (or power) that has been generated by a power generating section consisting of solar cells (i.e., a solar power generating section), for example. That is why the number of cells to be connected together in series can be reduced significantly. As a result, a new type of solar power generation system, which can be installed and maintained at lower cost and whose use may quickly spread in the near future, is provided.

Figure 4:
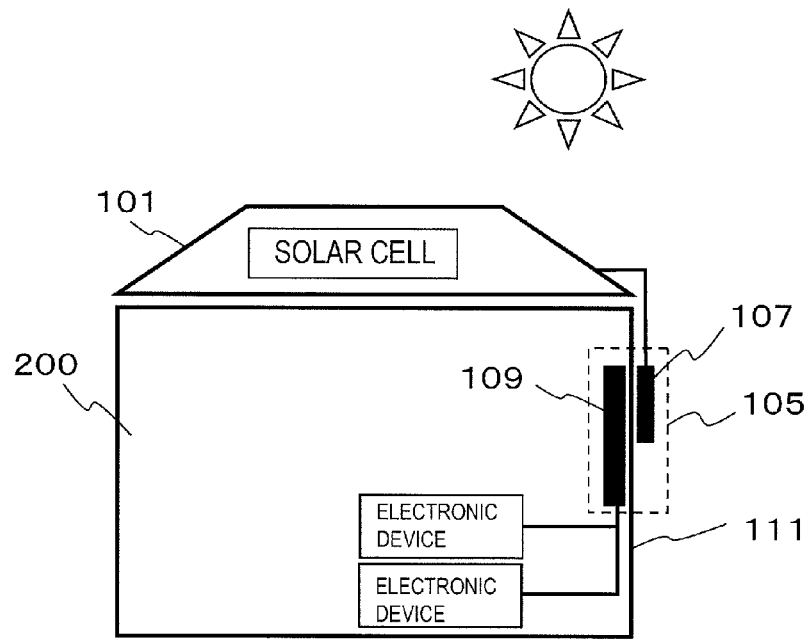
FIG. 4 is a schematic representation illustrating a typical application of a power generator according to the present invention.

FIG. 4 is a schematic representation illustrating a typical application of a power generator including the wireless power transmission unit of the present invention. As shown in FIG. 4, the power generator includes a solar power generating section 101, which is arranged outside of a building 200 (i.e., outdoors), and a wireless transmission section 105 for transmitting power to electronic devices, which are installed inside of the building 200. The solar power generating section 101 includes a number of solar cells that are connected together as power generating devices. The wireless transmission section 105 includes first and second antennas 107 and 109, which face each other with the wall 111 of the building 200 interposed between them. The first antenna 107 is connected to the outdoor solar power generating section 101 by way of the oscillator 103 (not shown), while the second antenna 109 is connected to the indoor electronic devices. It should be noted that the solar power generating section 101 does not have to be put on the roof but could also be arranged on the wall 111 of this building 200 or installed on any other building as well.

The power generating devices that form the power generating section of the present invention do not have to be solar cells but may also be any other type of power generating devices as well. For example, the power generating section may include fuel cells. The voltage increase effect of the present invention will also be achieved significantly in fuel cells because a fuel cell outputs DC energy with a relatively low voltage and is used in conjunction with a high-voltage system.

Figure 5:
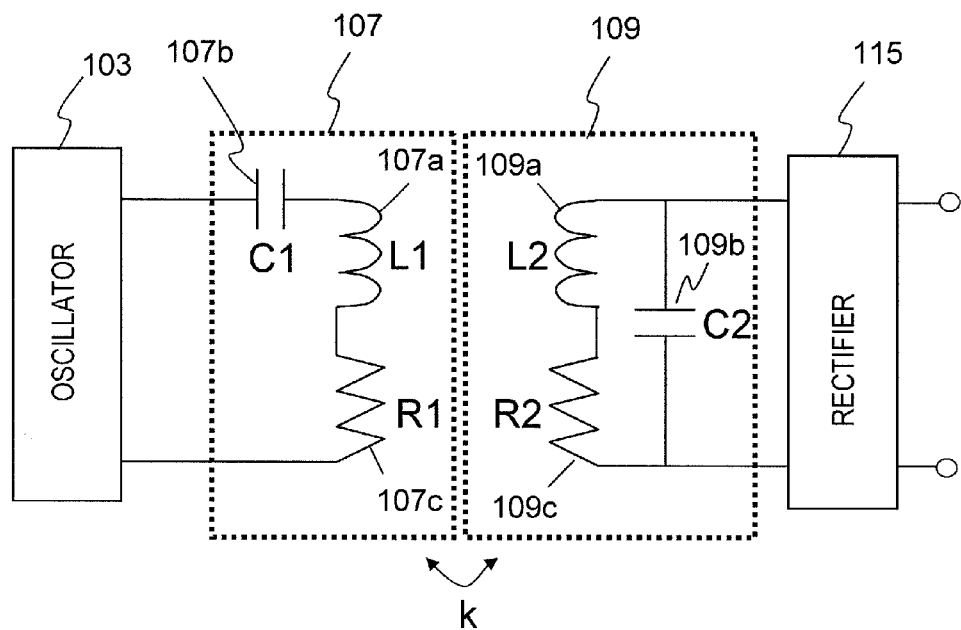
FIG. 5 illustrates a fundamental arrangement for another wireless power transmission unit (with a rectifier) according to the present invention.
Figure 6:
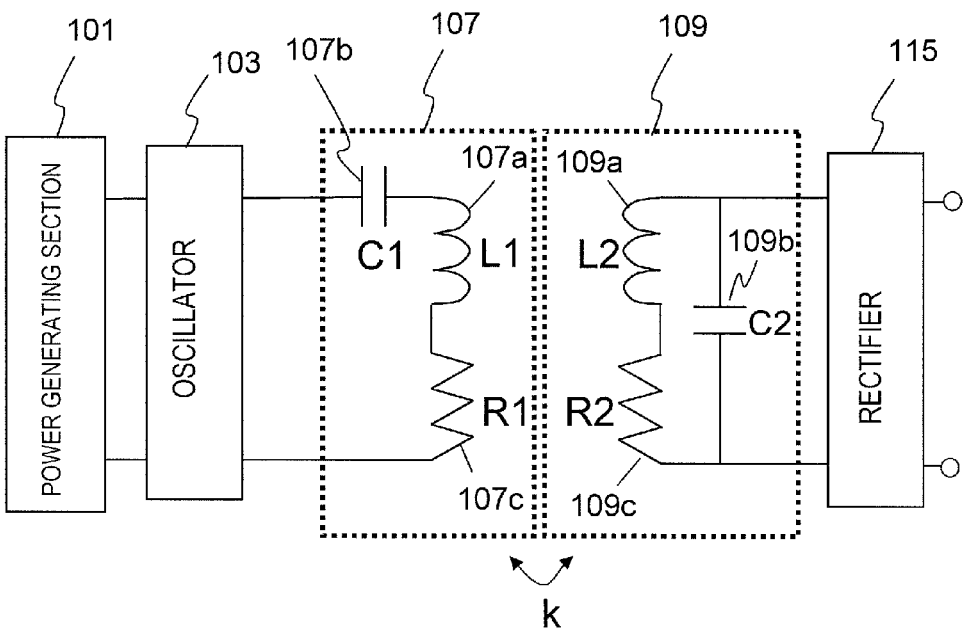
FIG. 6 illustrates a configuration for another power generator (with a rectifier) according to the present invention.

FIG. 5 illustrates another wireless power transmission unit according to the present invention. In addition to every component of the wireless power transmission unit described above (see FIG. 2), this wireless power transmission unit further includes a rectifier 115 that is connected to the second antenna 109. With this rectifier 115, the wireless power transmission unit can output DC energy. FIG. 6 illustrates a power generator according to the present invention including this type of wireless power transmission unit. Even if the power generating section 101 outputs DC energy with a low voltage, the power generator shown in FIG. 6 can still output DC energy after its voltage has been increased sufficiently during the wireless power transmission.

With the rectifier 115 connected to the second antenna 109, the voltage can be at least doubled if the following inequality is satisfied:

$$(L2/L1) \geq 4(k/(Voc \times Vrr))^2$$

where Vrr represents the voltage step-up ratio of the rectifier 115. This point will also be described in detail later.

Hereinafter, specific preferred embodiments of the present invention will be described with reference to the accompanying drawings.

Embodiment 1

Figure 7:
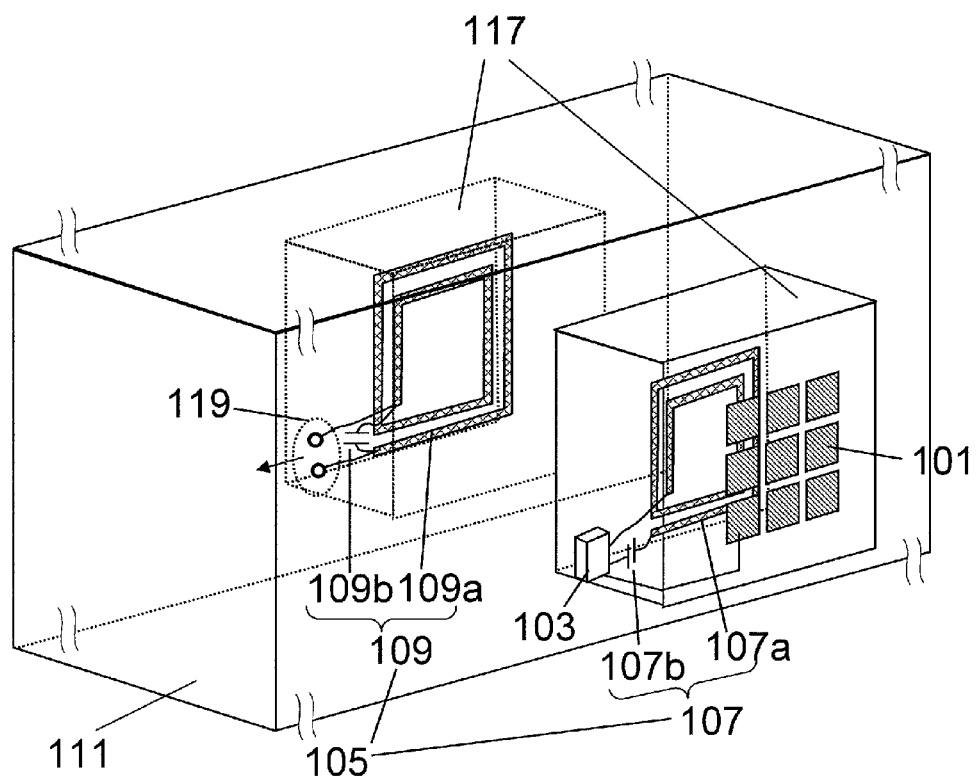
FIG. 7 illustrates a first specific preferred embodiment of a power generator according to the present invention.
Figure 8:
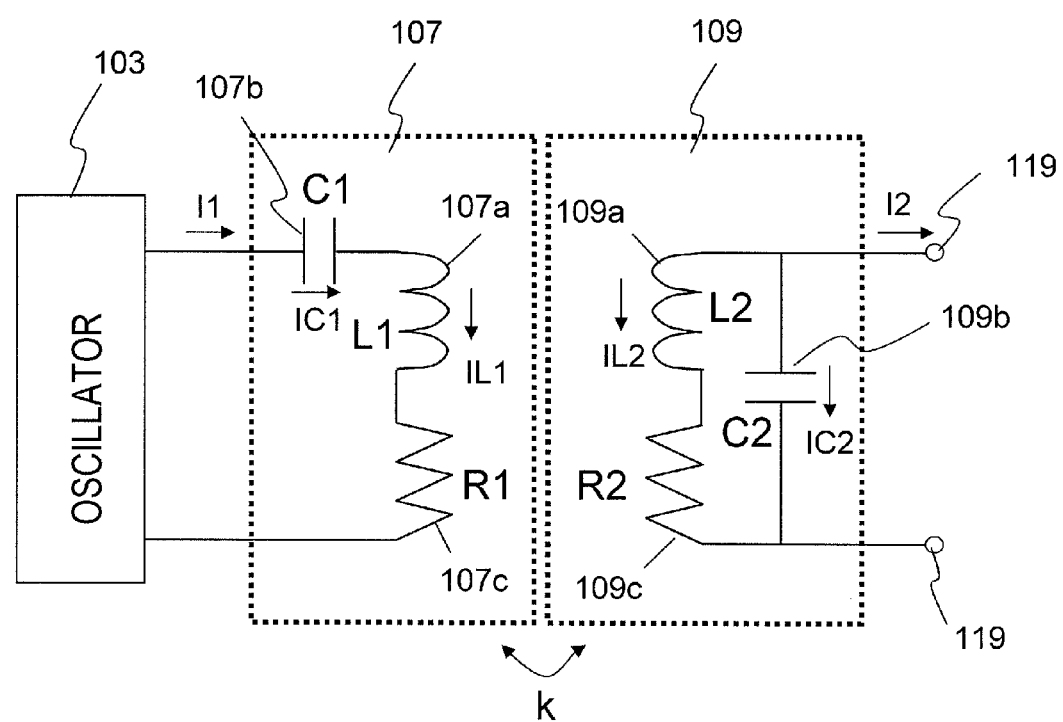
FIG. 8 is an equivalent circuit diagram of the wireless transmission section of the power generator as the first preferred embodiment of the present invention.

First of all, a First Specific Preferred Embodiment of a power generator according to the present invention will be described with reference to FIGS. 7 and 8. Specifically, FIG. 7 is a perspective view schematically illustrating the first preferred embodiment of the present invention and FIG. 8 is an equivalent circuit diagram of the wireless transmission section 105 shown in FIG. 7. In FIGS. 7 and 8, any component having substantially the same function as its counterpart shown in FIGS. 1 and 2 is identified by that counterpart's reference numeral.

As shown in FIG. 7, the power generator of this preferred embodiment includes a power generating section 101, an oscillator 103 and a wireless transmission section 105, which are connected together in series.

In this preferred embodiment, the power generating section 101 includes a number of solar cells (which will be sometimes simply referred to herein as "cells") that are connected together in series. To increase the power generation efficiency as much as possible, the solar cells are preferably crystalline silicon solar power generators. But the solar cells for use in the present invention may also be any of various other types of solar power generators that use a compound semiconductor material such as gallium arsenide or a CIS based material. Or the solar cells may even be any of numerous kinds of solar power generators that use an original material. If a semiconductor material is used, the crystal structure of the semiconductor may be a single crystalline, polycrystalline or amorphous one. Optionally, a tandem type solar power generator, in which several types of semiconductor materials are stacked one upon the other, may also be used.

As the oscillator 103, a class D, E or F amplifier that would realize high efficiency and low distortion may be used. Or a Doherty amplifier could also be used. Optionally, a sinusoidal wave may be produced with high efficiency by arranging either a low-pass filter or a band pass filter after a switching element that generates an output signal with a distortion component.

The wireless transmission section 105 includes the first and second antennas 107 and 109. To achieve as high transfer efficiency as possible, the first and second antennas 107 and 109 are preferably arranged so as to face each other. Nevertheless, the first and second antennas 107 and 109 do not always have to face each other but could be arranged in any other way unless they cross each other at right angles.

The DC energy that has been generated by the power generating section 101 is converted by the oscillator 103 into RF energy with high efficiency. Then, the RF energy is transmitted wirelessly through the space (i.e., the wall 111 in this example) by the wireless transmission section 105 and then output through an output terminal 119.

The first antenna 107 shown in FIG. 7 is a series resonant circuit having a first inductor 107a and a first capacitor 107b, while the second antenna 109 is a parallel resonant circuit consisting of a second inductor 109a and a second capacitor 109b. The respective resonant frequencies fT and fR of the first and second antennas 107 and 109 are set to be approximately equal to the frequency f0 of the RF energy generated by the oscillator 103. Also, in this preferred embodiment, the output impedance Zout of the second antenna 109 is set to be higher than the input DC impedance Zidc of the oscillator 103.

Based on this principle, according to this preferred embodiment, the distance between the first and second antennas 107 and 109 may be set within the range of several millimeters to several meters, and the energy can still be transferred highly efficiently even if there is the wall 111 between them. Naturally, even if there is no wall 111 between the first and second antennas 107 and 109 but if there is just an open space between them, the energy can also be transferred by such a non-contact method.

In addition, according to this preferred embodiment, not only can such a non-contact connection be done wirelessly but also the output voltage of the RF energy provided by the second antenna 109 can be increased sufficiently compared to the input voltage of the incoming RF energy provided to the first antenna 107.

To reduce multiple reflection of the RF energy between the circuit blocks and to improve the overall power generation efficiency, when the output terminal of the second antenna 109 is connected to a load, the output impedance Zoc of the oscillator 103 is preferably matched to the input impedance Zic of the first antenna 107. Likewise, when the oscillator 103 is connected to the first antenna 107, the output impedance Zout of the second antenna is preferably matched to the resistance value R of the connected load.

In this description, if two impedances are "equal to each other", then the impedances may naturally be exactly equal to each other but could also be just roughly equal to each other. Specifically, if the difference between the greater and smaller impedances is within 25% of the greater one, then those two impedances will also be regarded herein as being "equal to each other".

Also, the wall 111 does not have to be present between the first and second antennas 107 and 109 but the first and second antennas 107 and 109 may face each other with no obstacle put between them. Or even the roof may be interposed between the first and second antennas 107 and 109.

It should be noted that the first and second antennas 107 and 109 could be both installed indoors or both arranged outdoors. In either case, the voltage can also be increased while power is being transmitted wirelessly between the two antennas. If both of the first and second antennas 107 and 109 are installed indoors, then the outdoor solar power generating section 101 may be connected to the first antenna 107 by way of a cable to be passed through a hole that has been cut through the wall 111 of the building 200. On the other hand, if both of the first and second antennas 107 and 109 are arranged outdoors, the indoor electronic devices may also be connected to the second antenna 109 by way of a cable to be passed through a hole that has been cut through the wall 111 of the building 200. To eliminate such cable connection between inside and outside of the building, it is preferred that the first antenna 107 be arranged outdoors and the second antenna 109 be installed indoors as in the example illustrated in FIG. 7.

According to this preferred embodiment, the efficiency of the wireless power transmission depends on the gap between the first and second antennas 107 and 109 (which will be referred to herein as an "antenna-to-antenna gap") and on the magnitude of loss caused by circuit components that form the first and second antennas 107 and 109. As used herein, the "antenna-to-antenna gap" substantially means the gap between the two inductors 107a and 109a. The antenna-to-antenna gap can be estimated based on the feature size of the areas occupied by those antennas.

In one preferred embodiment of the present invention, the first and second inductors 107a and 109a both have the same planar pattern and are arranged so as to face each other and be parallel to each other. As used herein, the "feature size" of the areas occupied by the antennas refers to an inductor size of the smallest one of the antennas. Specifically, if the inductor of an antenna has a circular planar pattern, then the feature size is defined to be the diameter of the inductor. On the other hand, if the inductor has a square planar pattern, the feature size is defined to be the length of each side thereof. And if the inductor has a rectangular planar pattern, the feature size is defined to be the length of its shorter sides. According to this preferred embodiment, even if the antenna-to-antenna gap is approximately 1.5 times as large as the feature size of the antenna's arrangement area, energy can also be transferred with a wireless transfer efficiency of 90% or more. In addition, the output impedance of the wireless transmission section 105 can be 7,832 or more times as high as the input impedance.

In this preferred embodiment, the first and second inductors 107a and 109a have a spiral structure, of which the numbers of turns are N1 and N2, respectively, where N1>1 and N2>1. However, the first and second inductors 107a and 109a may also have a loop structure with a number of turns of one. These inductors 107a and 109a do not have to be made of a single-layer conductor pattern but may also be a series connection of multiple conductor patterns that have been stacked one upon the other.

The first and second inductors 107a and 109a are preferably made of copper, silver or any other conductor with good electrical conductivity. As RF current with RF energy flows mostly around the surface of a conductor, the surface of the conductor may be covered with a material with high electrical conductivity to increase the power generation efficiency. If the inductors 107a and 109a are designed so as to have a cavity in the middle of its cross section, their weight can be reduced. Furthermore, if the inductors 107a and 109a are formed by adopting a parallel wiring structure with Litz wires, for example, then the conductor loss per unit length can be reduced and the Q factors of the series resonant circuit and the parallel resonant circuit can be increased. As a result, power can be transmitted with even higher efficiency.

To cut down the manufacturing cost, the wiring may be formed at a time by ink printing technique. If necessary, a magnetic body may be arranged near the first and/or second inductor(s) 107a, 109a. However, the coupling coefficient between the first and second inductors 107a and 109a should not be set to be an excessively high value. For that reason, it is more preferable that inductors with an air-core spiral structure, which can set the coupling coefficient between the first and second inductors 107a and 109a to a moderate value, be used.

As the first and second capacitors 107b and 109b, any type of capacitors, which may have a chip shape, a lead shape or any other appropriate shape, may be used. Optionally, the capacitance produced between two levels of wires that interpose the air between them could also function as the first and second capacitors 107b and 109b. If the first and second capacitors 107b and 109b are implemented as MIM capacitors, a low-loss capacitor circuit can be formed by known semiconductor device processing or multilevel circuit board process.

To increase their long-term reliability, those components (such as inductors and capacitors) that form the first and second antennas 107 and 109 are preferably housed in a protective housing 117, which is preferably a waterproof one.

To minimize the transmission loss, the first and second antennas 107 and 109 are preferably arranged as close to each other as possible. Nevertheless, in order to adjust the voltage step-up ratio to a desired value, their positions inside the protective housing may be changed.

Optionally, the protective housing 117 may be directly fixed on some external member such as the wall 111 or the roof. If a ferromagnetic body and a magnet are provided for the protective housing 117 and the external member, respectively, so that the strength of magnetic coupling between the first and second antennas 107 and 109 is not affected, then the protective housing 117 can be readily attached to, and removed from, the external member by using magnetic force produced between the ferromagnetic body and the magnet. Alternatively, the protective housing 117 may be attached to, and removed from, the external member by providing a sucker for either the protective housing 117 or the external member.

Next, the voltage increase effect produced by the power generator of the present invention will be described with reference to FIG. 8.

Suppose the first antenna 107 at the transmitting end and the second antenna 109 at the receiving end are coupled with each other at a coupling coefficient k. By measuring the two resonant frequencies fL and fH to be isolated when two resonators (i.e., the antennas 107 and 109) that produce resonance at the same frequency f0 are arranged close to each other, the coupling coefficient can be derived by the following Equation (2):

$$k=(fH^2-fL^2)/(fH^2+fL^2) \quad (2)$$

The frequency f0 of the oscillator 103 is preferably set to be close to the resonant frequencies fL and fH. More specifically, if the Q factors of the pair of coupled resonators at the resonant frequencies fL and fH are represented by QL and QH, respectively, f0 is preferably set so as to satisfy the following inequality (3):

$$fL-fL/QL \leq f0 \leq fH+fH/QH \quad (3)$$

Also, the mutual inductance M produced between the first inductor 107a with the inductance L1 and the second inductor 109a with the inductance L2 and the coupling coefficient k satisfy the following Equation (4):

$$M=k \times (L1 \times L2)^{0.5} \quad (4)$$

As is apparent from Equation (4), the coupling coefficient k is identical to the well-known coupling coefficient, which has been conventionally used as a parameter representing the strength of coupling between inductors or resonators. The value of the coupling coefficient k satisfies 0<k<1. In the conventional energy transfer by electromagnetic induction, the configurations of antennas are designed to achieve a high coupling coefficient k (if possible close to one). In contrast, the coupling coefficient k in a preferred embodiment of the present invention may be set less than 0.5 as described later.

Supposing in the parallel resonant circuit of the second antenna 109, the RF current flowing through the second inductor 109a is identified by IL2 and the RF current flowing through the second capacitor 109b is identified by IC2, the output RF current I2 flowing in the direction shown in FIG. 8 is represented by the following Equation (5):

$$I2=-IL2-IC2 \quad (5)$$

Also, supposing the RF current flowing through the first inductor 107a is identified by IL1, the following Equation (6) can be derived using the RF current IL2 flowing through the second inductor 109a, the RF current IC2 flowing through the second capacitor 109b, the inductance L2 of the second inductor 109a, the parasitic resistance R2 of the second inductor 109a, the inductance L1 of the first inductor 107a and the capacitance C2 of the second capacitor 109b:

$$(R2+j\omega L2)\times IL2+j\omega M\times IL1=IC2/(j\omega C2) \quad (6)$$

Since the resonance condition is satisfied by the second antenna 109, the following Equation (7) is met:

$$\omega L2=1/(\omega C2) \quad (7)$$

The following Equation (8) can be derived from Equations (5), (6) and (7):

$$R2\times IL2+j\omega M\times IL1=j\omega L2\times I2 \quad (8)$$

By modifying this Equation (8), the following Equation (9) is obtained:

$$I2=k\times(L1/L2)^{0.5}\times IL1-j(R2/\omega L2)\times IL2 \quad (9)$$

On the other hand, an index Q factor for evaluating the degree of low loss of the resonator of the first antenna 107 is given by the following Equation (10):

$$Q2=\omega L2/R2 \quad (10)$$

In this case, if the Q factor of the resonator is very high, approximation that neglects the second term of the right side of Equation (6) is permitted. Thus, the magnitude of the RF current (output current) I2 produced by the second antenna 109 is eventually derived by the following Equation (11):

$$I2=k\times(L1/L2)^{0.5}\times IL1 \quad (11)$$

In this case, the RF current I2 depends on the RF current I1 supplied to the resonator at the transmitting end (i.e., the first antenna 107), which will be the RF current IL1 flowing through the first inductor 107a, the coupling coefficient k between the resonators (antennas), and the first and second inductances L1 and L2.

As can be seen from Equation (11), the current step-up ratio Ir of the power generator of this preferred embodiment is represented by the following Equation (12):

$$Ir=|I2/I1|/Voc=k/Voc\times(L1/L2)^{0.5} \quad (12)$$

Also, the voltage step-up ratio Vr and the impedance conversion ratio Zr are given by the following Equations (13) and (14), respectively:

$$Vr=(Voc/k)\times(L2/L1)^{0.5} \quad (13)$$

$$Zr=(Voc/k)^2\times(L2/L1) \quad (14)$$

As can be seen from Equation (13), if $(L2/L1)>(k/Voc)^2$ is satisfied, the voltage step-up ratio Vr is greater than one. Thus, it can be seen that if the coupling coefficient k falls, the voltage step-up ratio Vr rises. According to the conventional energy transfer method by electromagnetic induction, a decrease in coupling coefficient k will lead to a steep decrease in transfer efficiency. According to the magnetic resonant coupling method of the present invention, however, any decrease in coupling coefficient k will never cause such a steep decrease in transfer efficiency. Particularly if the respective Q factors of the resonators that are used as the first and second antennas 107 and 109 are set to be high values, the decrease in transfer efficiency can be minimized.

To avoid the influence of partial shading on a solar power generation system, a parallel connection of multiple solar power generating sections is more preferred to a series connection of a lot of solar power generating sections. To make a parallel connection of two solar power generating sections realize the same voltage characteristic as what is normally achieved by a series connection of two solar power generating sections, the output voltages of the respective solar power generating sections need to be doubled.

As can be seen from Equation (12), the voltage step-up ratio Vr gets equal to two when $(L2/L1)=4\times(k/Voc)^2$ is satisfied. Since that relation $(L2/L1)\leq 4\times(k/Voc)^2$ is satisfied according to the present invention, a voltage step-up ratio Vr of 2 or more can be achieved.

If $(L2/L1)\geq 100\times(k/Voc)^2$ is satisfied, a voltage step-up ratio Vr of 10 or more is achieved. And if $(L2/L1)\geq 10000\times(k/Voc)^2$ is satisfied, a voltage step-up ratio Vr of 100 or more is achieved.

It is easy for the power generating section of the present invention to set the k, Voc, L2 and L1 values so as to achieve such a high voltage step-up ratio Vr.

Hereinafter, the effects to be achieved by the wireless power transmission unit of this preferred embodiment will be described in comparison with a conventional wireless power transmission unit.

In the wireless power transmission unit disclosed in United States Patent Application Publication No. 2008/0278264, energy is transferred between two magnetic resonators. However, as that wireless power transmission unit uses the same resonance method for the two resonators, the voltage is not increased while the energy is transferred. On the other hand, the increase in output voltage caused by the wireless power transmission unit of the present invention is an effect that has never been produced by that conventional power transmission unit and that is produced solely by adopting two different resonance structures, namely, a series magnetic resonant structure and a parallel magnetic resonant structure, for the first and second antennas, respectively, and by transferring energy between those two different resonant structures.

It should be noted that a series resonant circuit and a parallel resonant circuit could also be used in a conventional RF telecommunications system such as an RF tag. However, the terminal impedance at the terminal of a probe for use to test the characteristic of an RF block of such an RF telecommunications system and the characteristic impedance of its RF cable are basically set to be 50Ω. That is why at a point of connection with an antenna of such an RF telecommunications system, circuit blocks are normally connected together with the impedance matched to 50Ω in both of its transmitter and receiver.

On the other hand, in the wireless transmission section of the present invention, the input to output impedance conversion ratio Zr is defined to be as high as over 100, or sometimes more than 20,000 depending on the conditions, as will be described later for specific examples of the present invention. And that high input to output impedance conversion ratio Zr would never have been imagined to be achievable by the conventional RF telecommunications system.

On top of that, according to the present invention, the longer the distance between the two resonators (or antennas) and the lower the coupling coefficient k, the higher the voltage step-up ratio Vr achieved will be. This is also an effect that would never have been easily expected from the structure and functions of the wireless transmission section for a known telecommunications system.

In a transformer for use in a power circuit, for example, two inductors are arranged close to each other so as to function as a sort of wireless power transmission unit. However, no magnetic resonant coupling is produced between those inductors. Also, such a transformer could achieve the voltage step-up effect by increasing the ratio of the number of turns N2 of the second inductor to the number of turns N1 of the first inductor. However, if the transformer booster has to achieve a voltage step-up ratio of 10 or more, then the number of turns N2 should be increased at least tenfold with respect to the number of turns N1. Such a significant increase in the number of turns N2 would increase the parasitic resistance component R2 in the second inductor proportionally, thus causing a decrease in transfer efficiency after all. In contrast, according to the present invention, even if the numbers of turns N1 and N2 are the same, a high Zr can still be achieved.

It should be noted that according to the present invention, there is no need to set the respective inductances L1 and L2 of the first and second inductors 107a and 109a to be equal to each other. For example, if the inductance L2 is set to be greater than the inductance L1, the voltage step-up ratio Vr can be increased.

Figure 9:
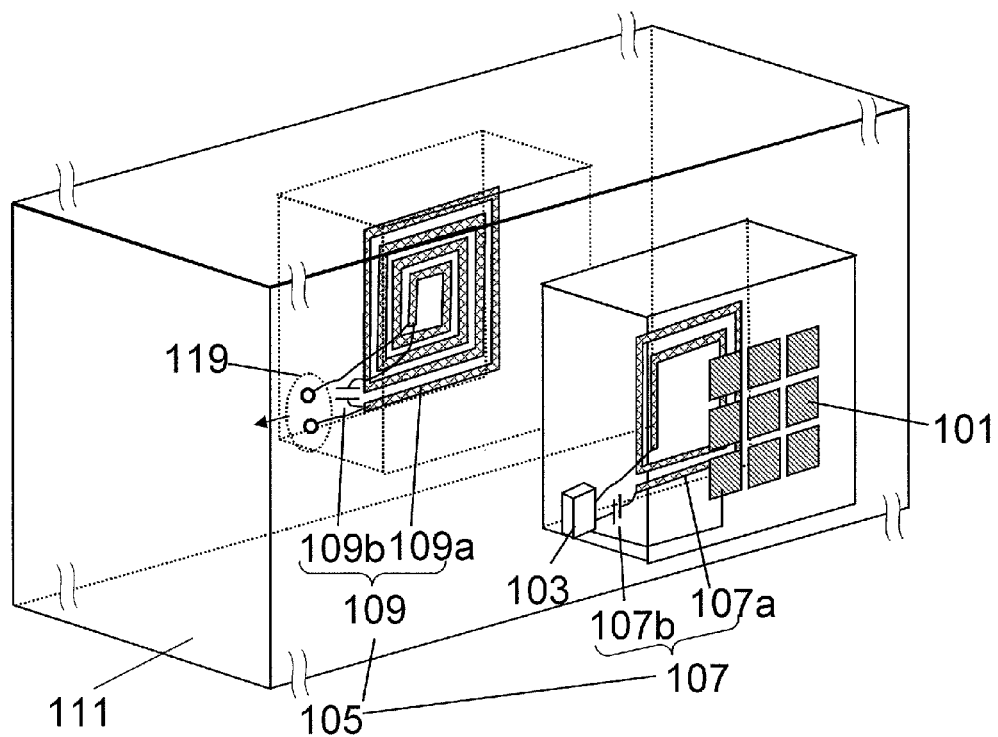
FIG. 9 illustrates a modified example of the first preferred embodiment of the power generator according to the present invention.

FIG. 9 illustrates a preferred embodiment in which to increase the inductance L2 of the second inductor 109a, the number of turns N2 of the second inductor 109a is set to be greater than the number of turns N1 of the first inductor 107a. If N2/N1 is greater than one, a high voltage step-up ratio can be achieved with smaller loss compared to a situation where the voltage is increased using a known transformer booster.

The inductance L2 can also be greater than the inductance L1 by providing a larger area for the second antenna 109 than the first antenna 107, instead of setting the N2/N1 ratio to be greater than one (with the N2/N1 ratio kept equal to one).

In the following description, at least the front side of the first and second inductors 107a and 109a is supposed to have a planar shape and the first and second inductors 107a and 109a are supposed to be arranged so as not to cross each other at right angles. FIG. 10(a) illustrates the arrangement area 113 of the second antenna 109 that has been projected perpendicularly to the plane on which the first antenna 107 is arranged. As used herein, the "plane" on which the first antenna 107 is arranged is defined to be a single plane including the front side of the first inductor 107a (which will be referred to herein as a "first arrangement plane"). FIG. 10(b) is a cross-sectional view illustrating the arrangement plane 240 of the first inductor 107a. In the example illustrated in FIG. 10(b), the first inductor 107a is parallel to its arrangement plane 240. On the other hand, the second antenna's arrangement area is defined herein to be an area that has been projected perpendicularly to the arrangement plane 240 of the first antenna 107 and that is surrounded with the projected profile of the second inductor 109a.

FIG. 10(a) illustrates the first inductor 107a that has projected perpendicularly to the arrangement plane of the first antenna 107. In the example illustrated in FIG. 10(a), the first inductor 107a that has been projected onto the arrangement plane of the first antenna 107 is present inside of, and close to an edge of, the arrangement area 113. By adopting such an arrangement, an even higher voltage step-up ratio is achieved.

To control the voltage step-up ratio of the wireless transmission section 105, the shapes and sizes of the antennas may be defined to make an asymmetric combination and the first antenna may have a bigger size than the second antenna.

Figure 10:
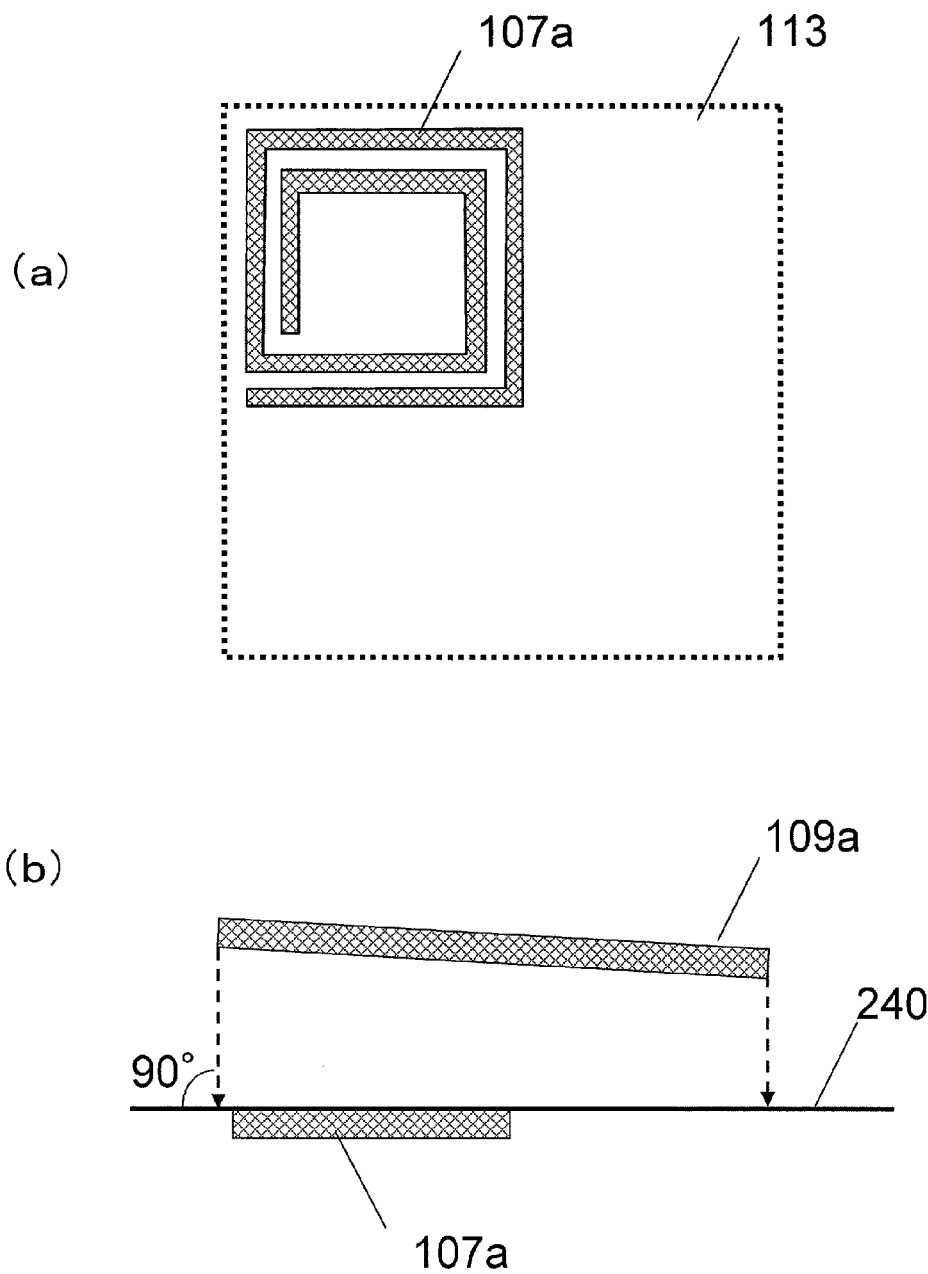
FIG. 10(a) is a plan view illustrating an exemplary arrangement of two inductors and FIG. 10(b) is a schematic cross-sectional view thereof.

The first and second antennas 107 and 109 do not have to be arranged as shown in FIG. 10 but may have their positions switched with each other. That is to say, the first antenna 107 shown in FIG. 10 may be replaced with the second antenna 109 and the arrangement area 113 may be replaced with the arrangement area of the first antenna 107. In that case, the "arrangement area of the first antenna 107" refers to the area that has been projected onto the arrangement plane of the second antenna 109 and that is surrounded with the projected profile of the inductor 107a. Also, the "arrangement plane of the second antenna 109" is defined to be a single plane including the front side of the second inductor 109a (which will be referred to herein as a "second arrangement plane"). To achieve sufficiently high transfer efficiency, the first and second arrangement planes are preferably parallel to each other. But those planes do not have to be exactly parallel to each other. It should be noted that the first and second inductors 107a and 109a do not have to have a planar shape.

Embodiment 2

Figure 11:
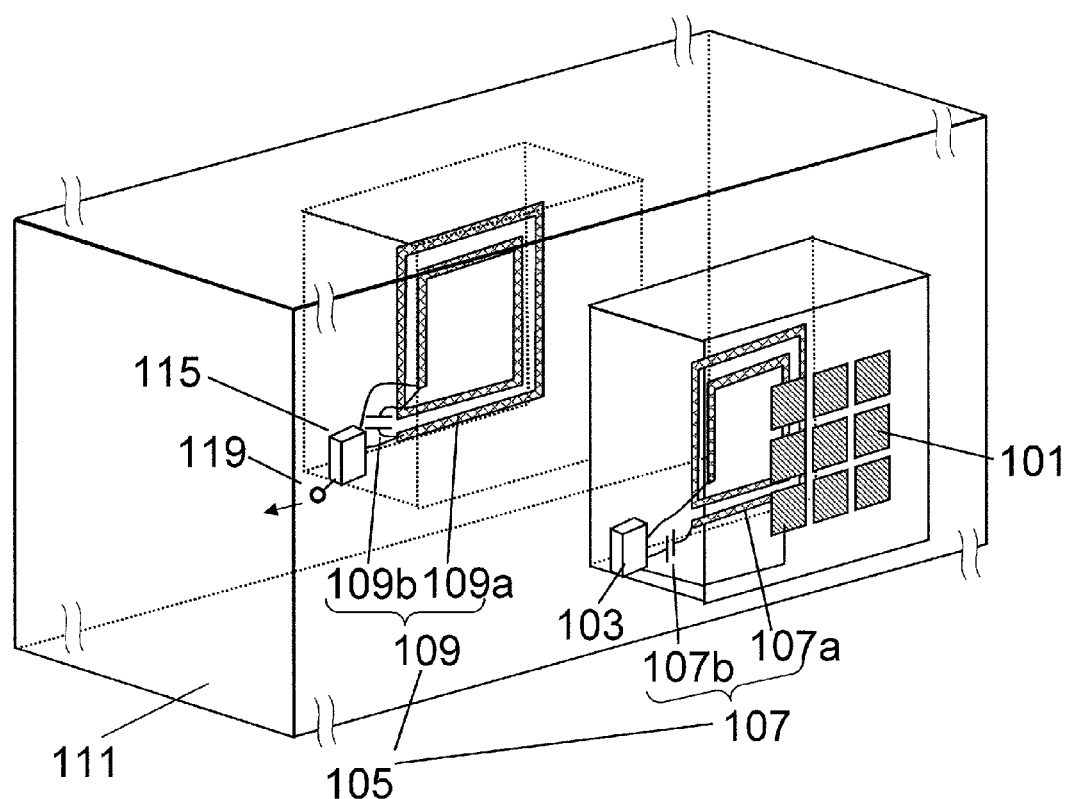
FIG. 11 illustrates a power generator as a second specific preferred embodiment of the present invention.

Hereinafter, a second preferred embodiment of a power generator according to the present invention will be described with reference to FIG. 11, which illustrates a fundamental arrangement for the power generator of this second preferred embodiment. In FIG. 11, any component having substantially the same function as its counterpart of the first preferred embodiment described above is identified by that counterpart's reference numeral and the description thereof will be omitted herein to avoid redundancies.

In the power generator of this second preferred embodiment, a rectifier 115 is connected in series to the output section of the second antenna 109, which is a primary difference from the power generator of the first preferred embodiment described above.

The power generator of this preferred embodiment can also achieve the same effects as what is achieved by the counterpart of the first preferred embodiment. In addition, DC power can be obtained as output according to this preferred embodiment.

To reduce multiple reflection of the RF energy between the circuit blocks and to improve the overall power generation efficiency, when the output terminal of the rectifier 115 is connected to a DC load or a DC load system (neither is shown), the output impedance Zoc of the oscillator 103 is preferably substantially matched with the input impedance Zin of the first antenna 107. Likewise, when the oscillator 103 is connected to the first antenna 107, the output impedance Zout of the rectifier 115 is preferably substantially matched to the resistance value R of the DC load or the DC load system (not shown).

As the rectifier 115, various types of rectifiers, including full-wave rectifiers and bridge rectifiers, are available. FIG. 12(a) is a circuit diagram illustrating a half-wave voltage doubler rectifier circuit, while FIG. 12(b) is a circuit diagram illustrating a full-wave voltage doubler rectifier circuit. There are other types of high voltage step-up ratio rectifiers that can achieve a voltage step-up ratio of three or more. And any of those various rectifiers may be used in the present invention.

Figure 12:
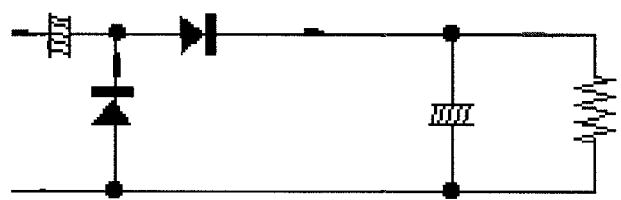
Figure 12:
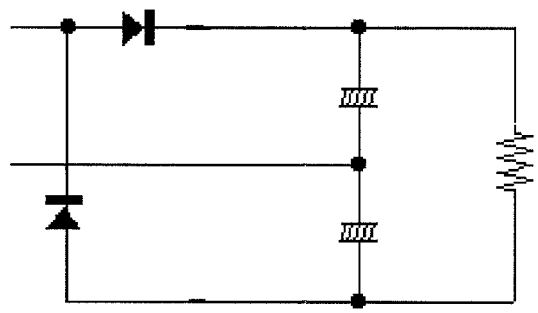

With the voltage doubler rectifier circuit shown in FIG. 12, a DC voltage, which is twice as high as the RF voltage supplied to the rectifier 115, can be output. And by using such a rectifier 115, the voltage that has already been increased by the wireless transmission section 105 can be further raised.

According to this preferred embodiment, the voltage step-up ratio Vr and the impedance conversion ratio Zr that have been derived for the first preferred embodiment are rewritten with the voltage step-up ratio Vrr of the rectifier 115 into the following Equations (15) and (16):

$$Vr=(Voc \times Vrr/k) \times (L2/L1)^{0.5} \quad (15)$$

$$Zr=(Voc \times Vrr/k)^2 \times (L2/L1) \quad (16)$$

According to this preferred embodiment, if the relation $(L2/L1) > (k/(Voc \times Vrr))^2$ is satisfied, the voltage step-up ratio can be greater than one as can be seen from Equation (15).

To achieve a voltage step-up ratio Vr of two or more, $(L2/L1) \geq 4 \times (k/(Voc \times Vrr))^2$ needs to be satisfied. And if $(L2/L1) \geq 100 \times (k/(Voc \times Vrr))^2$ is satisfied, a voltage step-up ratio Vr of 10 or more is achieved.

The power generator of this preferred embodiment realizes a DC power supply system. Currently, a DC power supply system with a working voltage of 24 Vdc is being developed. However, if $(L2/L1) \geq 2304 \times (k/(Voc \times Vrr))^2$ is satisfied, the voltage can be increased 48-fold from 0.5 V to 24 V. For that reason, if the present invention is applied to a DC power supply system, $(L2/L1) \geq 2304 \times (k/(Voc \times Vrr))^2$ is preferably satisfied. And if $(L2/L1) \geq 10000 \times (k/(Voc \times Vrr))^2$ is satisfied, a voltage step-up ratio Vr of 100 or more is achieved.

Embodiment 3

Figure 13:
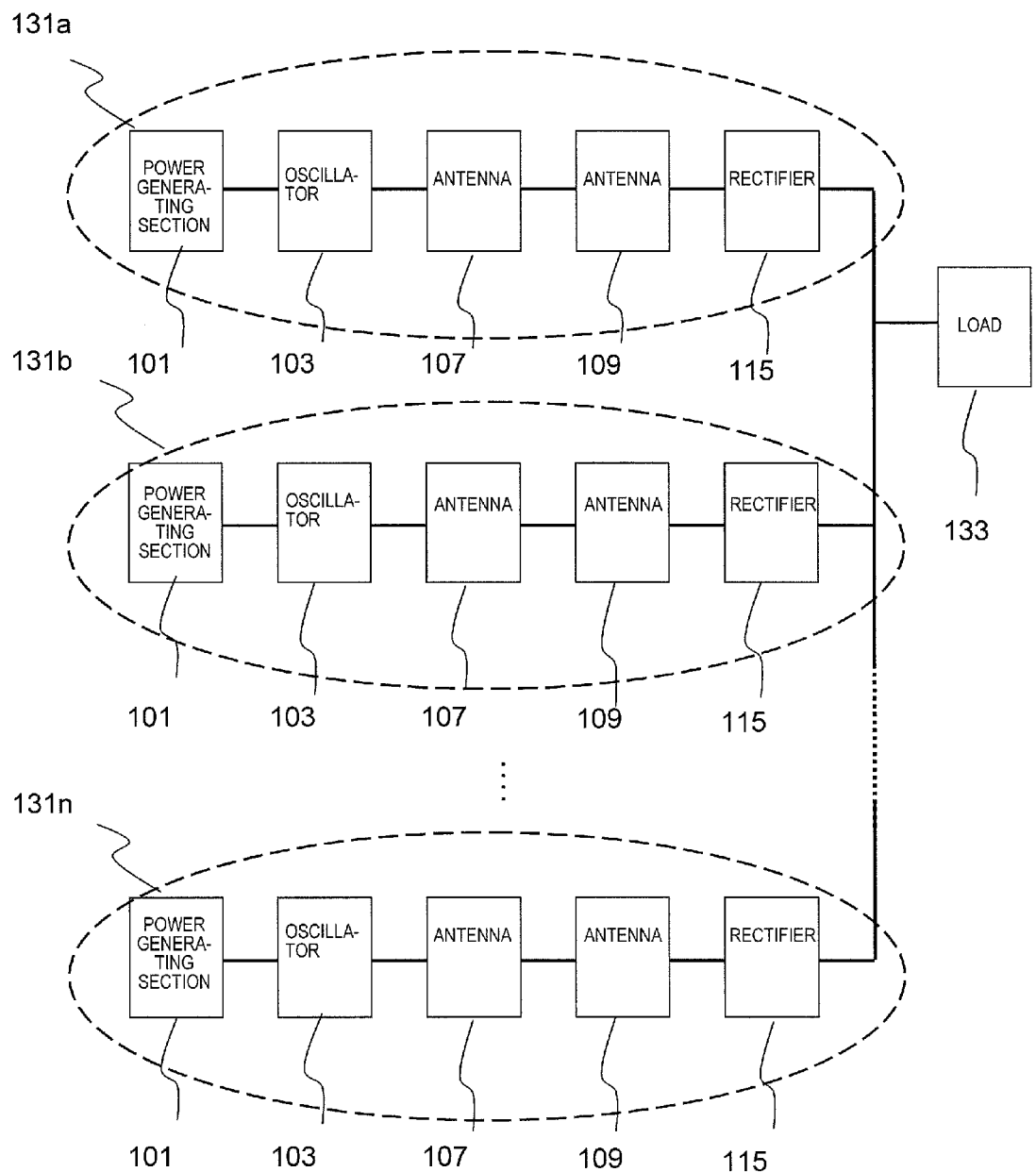
FIG. 13 is a block diagram illustrating a power generation system as a third specific preferred embodiment of the present invention.

Hereinafter, a preferred embodiment of a power generation system according to the present invention will be described with reference to FIG. 13, which is a block diagram illustrating a power generation system as a third specific preferred embodiment of the present invention. In FIG. 13, any component having substantially the same function as its counterpart of the preferred embodiments described above is identified by that counterpart's reference numeral and the description thereof will be omitted herein to avoid redundancies.

The power generation system shown in FIG. 13 includes a number of power generators 131a, 131b, ... and 131n that are connected in parallel with each other. In this preferred embodiment, each of these power generators 131a, 131b, ... and 131n has the arrangement of the second preferred embodiment described above. However, to achieve the effects of the present invention, the power generation system of the present invention just needs to include at least two power generators that are connected in parallel with each other.

Each of these power generators 131a through 131n includes a solar power generating section 101, an oscillator 103, first and second antennas 107, 109 and a rectifier 115, which are connected together in series.

The DC energy that has been generated by the solar power generating section 101 is converted into RF energy by the oscillator 103 with high efficiency. That RF energy is next transferred by non-contact method from the first antenna 107 at the transmitting end to the second antenna 109 at the receiving end and then converted into DC energy again by the rectifier 115. Thereafter, the DC energies (or powers) that have been output by the respective power generators 131a through 131n are added together by the parallel connection and then the sum is supplied to a load 133.

According to this preferred embodiment, the output voltage supplied by each of these power generators 131a through 131n is much higher than the output voltage of its own solar power generating section. For that reason, even if the power generators 131a through 131n are connected in parallel with each other, a voltage value that is even closer to the value required by the load 133 can be obtained.

On top of that, since a number of power generators 131a through 131n are connected in parallel with each other, the performance of this power generation system should be more stabilized than the conventional one even if any of those power generators 131a through 131n deteriorate or if some difference was produced in the condition for irradiating the power generators 131a through 131n with sunlight.

The load 133 may be a normal electronic device or a storage battery. Also, the load 133 may be an inverter function circuit for converting direct current into alternating current, a voltage step-up/down function circuit, or a power conditioner that has both of the inverter function and the voltage step-up/down function in combination. To match to the impedance of the load 133, some of the power generators could be connected together in series in the power generation system of this preferred embodiment.

EXAMPLES

Example 1

Hereinafter, a first specific example of the present invention will be described.

First of all, nine single-crystal silicon based solar power generating elements (i.e., solar cells), of which the photosensitive plane had a square surface with a size of 12 cm each side, were connected together in series to obtain a solar power generating section with an output voltage of 4.5 V, an output current of 1 A, and an output impedance of 4.5Ω. And an oscillator with an output frequency of 3 MHz and an output impedance Zoc of 5Ω was connected to the output terminal of that solar power generating section. The oscillator, which was implemented as a class F amplifier, achieved an efficiency of 95%. In this first specific example, the oscillator has a voltage step-up ratio Vr of 1.05.

The first and second antennas were designed so as to have a resonant frequency of 3 MHz, which was equal to the output frequency of the oscillator. Specifically, the first antenna was fabricated by connecting a first inductor with an inductance of 1.988 μH and a first capacitor with a capacitance of 830 pF in series together. On the other hand, the second antenna was fabricated by connecting a second inductor with an inductance of 1.988 μH and a second capacitor with a capacitance of 830 pF in parallel with each other. Each of the first and second inductors was a Litz wire that had been formed by arranging multiple sets of 30 copper wires, each having a diameter of 80 μm, in parallel with each other so that those sets were electrically insulated from each other. The two inductors both had a square shape with a size of 36 cm each side and their number of turns was two. Each antenna (or resonator) had a Q factor of 1350.

The first and second antennas were arranged so that their front sides faced each other and were parallel to each other with a gap of g (cm) left between them. And with that gap g varied within the range of 5 cm through 75 cm, the best input and output impedances Zin and Zout that would maximize the wireless transfer efficiency between the resonators with respect to each g value were looked for. The actual measurements were carried out in the following two steps:

First of all, the RF characteristic between the input and output terminals of the two antennas (or resonators) was measured with a network analyzer with a terminal impedance of 50Ω, thereby obtaining measurement data with a reference impedance of 50Ω.

Next, based on the measurement data thus collected, the impedance conditions Zin and Zout for the input and output terminals that would minimize signal reflection at the terminals were derived by making circuit simulations.

Figure 14:
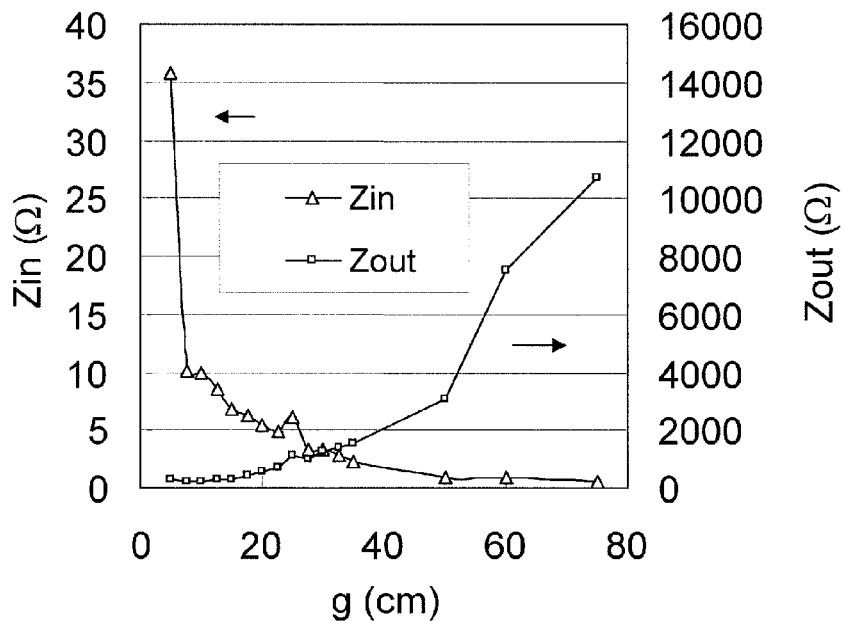
FIG. 14 is a graph showing the dependences of the input and output impedances Zin and Zout of the wireless transmission section on the antenna-to-antenna gap in a specific example of the present invention.

FIG. 14 is a graph showing the g dependences of Zin and Zout derived. On the other hand, FIG. 15 is a graph showing the g dependences of the input/output impedance conversion ratio Zr and the transfer efficiency of the wireless transmission section.

The present inventors discovered that the Zr value was more than one through the entire range of the gap g and that the greater the gap g, the more steeply Zr increased. More specifically, when g=5 cm, Zr was 7.7. When g=7.5 cm, Zr was 20.6. And when g=75 cm, Zr was as large as 23158.

Also, when g=5 mm, the coupling coefficient k between the resonators was 0.376, which is just 4% greater than the k value of 0.361 to be derived for only the wireless transmission section by substituting Voc=1 for Equation (14). These results demonstrated the validity of Equation (14).

Figure 15:
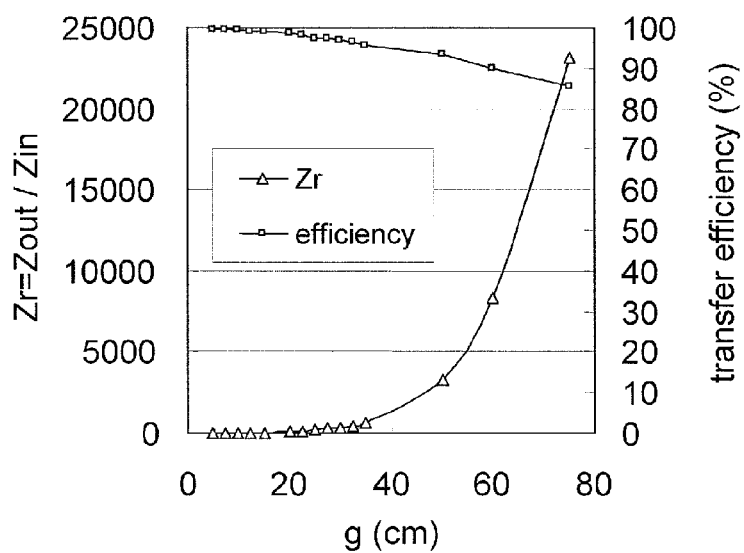
FIG. 15 is a graph showing how the input/output impedance conversion ratio Zr and the wireless transfer efficiency of the wireless transmission section depend on the antenna-to-antenna gap in a specific example of the present invention.
Figure 16:
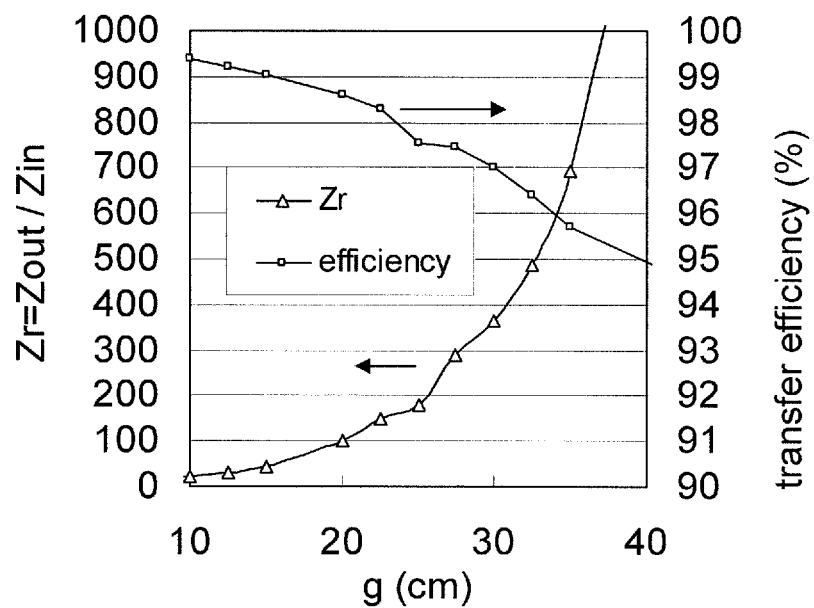
FIG. 16 is a graph showing how the input/output impedance conversion ratio Zr and the wireless transfer efficiency of the wireless transmission section depended on the antenna-to-antenna gap in a first specific example of the present invention.

FIG. 16 is a graph showing a part of the graph of FIG. 15, where 10 cm≦g≦40 cm, on a larger scale. The wall of a normal building has a thickness of approximately 10 to 30 cm. And if the gap g fell within that range, Zr was as large as 20 to 363.

To get a high Zr value of 147, which was obtained when g=22.5, achieved by a transformer, the ratio of the number of turns of secondary coil to that of primary coil should be set to be 12.1. In a specific example of the present invention, Zr could be increased to 147 while using the first and second antennas that had a number of turns ratio of one.

The forward pass characteristic to be obtained by matching the input and output terminal impedances to the input and output impedances Zin and Zout derived by the method described above corresponds to the wireless transfer efficiency in the power generator of the present invention. As shown in FIG. 16, even when g=22.5 cm, a wireless transfer efficiency of as high as 98.3% could also be achieved.

According to the first specific example of the present invention, by connecting the oscillator described above to the wireless transmission section, RF output could be obtained with an efficiency of as high as 93.1% from the input DC voltage. The voltage step-up ratio with respect to the input DC voltage was 12.7. Only a part of the input power would have changed into heat due to the loss that had been caused by slight mismatch between the circuit blocks.

Comparative Examples 1 to 3

As in Example 1 described above, two power generators, of which the wireless transmission section also included resonators with a resonant frequency of 3 MHz at both the transmitting and receiving ends, were made as Comparative Examples 1 and 2. The only difference between Example 1 and Comparative Examples 1 and 2 was that the two antennas (or resonators) of Comparative Examples 1 and 2 were of the same resonance type. More specifically, in Comparative Example 1, the two antennas thereof were both LC series resonant circuits. On the other hand, in Comparative Example 2, the two antennas thereof were both LC parallel resonant circuits. The circuit constants of each of these resonators were the same as those of Example 1. Meanwhile, Comparative Example 3, which was designed so that no resonance would be produced between the two antennas, was also made.

Example 2

In Example 1 described above, the number of turns N1 of the first inductor of the first antenna was supposed to be equal to the number of turns N2 of the second inductor of the second antenna. On the other hand, as a second specific example of the present invention, a power generator, of which those inductors have mutually different numbers of turns, was fabricated. Specifically, in Example 2, the number of turns N2 was increased from two to four. The antennas themselves had the same dimensions as their counterparts of Example 1 described above.

Example 3

In Example 1 described above, the first and second antennas were supposed to have the same feature size. However, this third specific example of the present invention is a power generator in which the second antenna had a bigger feature size than the first antenna thereof. Specifically, in Example 3, the square that defines the profile of the second antenna had a length of 72 cm each side. Also, in this Example 3, the first and second antennas were arranged so that the line segment connecting together the respective centers of mass of the first and second antennas would cross the arrangement planes of the two antennas at right angles.

Example 4

Furthermore, as a fourth specific example of the present invention, a power generator was made with the arrangement of Example 3 changed. Specifically, as shown in FIG. 10, the first and second antennas were arranged so that when the second antenna's arrangement area (as indicated by the dotted line in FIG. 10) was projected onto the first antenna's arrangement plane, the first antenna would be located substantially within that arrangement area but close to an edge of that area.

The following Table 1 summarizes the structures of the resonators of Example 1, Comparative Examples 1 to 3, and Examples 2 to 4 and also shows the wireless transmission characteristic when g=22.5 cm.

TABLE 1

| | Resonator at transmitting end | Resonator at receiving end | Zin (Ω) | Zout (Ω) | Vr | Zr | Wireless transfer efficiency (%) |
|---|---|---|---|---|---|---|---|
| Ex. 1 | Series resonance | Parallel resonance | 4.92 | 725 | 12.1 | 147 | 98.3 |
| Cmp. Ex. 1 | Series resonance | Series resonance | 6.4 | 6.4 | 1 | 1 | 98.6 |
| Cmp. Ex. 2 | Parallel resonance | Parallel resonance | 635 | 635 | 1 | 1 | 98.6 |
| Cmp. Ex. 3 | No resonance | No resonance | 60 | 60 | 1 | 1 | 1.1 |
| Ex. 2 | Series | Parallel | 5.15 | 1190 | 15.2 | 231 | 98.6 |

TABLE 1-continued

|  | Resonator at transmitting end | Resonator at receiving end | Zin (Ω) | Zout (Ω) | Vr | Zr | Wireless transfer efficiency (%) |
|---|---|---|---|---|---|---|---|
| Ex. 3 | Series resonance | Parallel resonance | 9.06 | 2575 | 16.9 | 284 | 96.7 |
| Ex. 4 | Series resonance | Parallel resonance | 7 | 2892 | 20.3 | 413 | 96.2 |

As can be seen easily from Table 1, in Example 1, a very high voltage step-up ratio Vr could be achieved with high-efficiency power transmission realized wirelessly. Meanwhile, according to Examples 2 to 4, better Zr and Vr than in Example 1 could be obtained.

Example 5

As a fifth specific example of the present invention, a power generator was made by connecting a voltage doubler rectifier circuit to the output of the second antenna with the arrangement of Example 1. The half-wave voltage doubler rectifier circuit thus obtained achieved a DC conversion efficiency of as high as 93.4% at a resonant frequency of 3 MHz. The rectifier thus introduced realized a voltage boosting function with a voltage step-up ratio Vrr of two, at which the output DC voltage would be twice as high as the input RF voltage. And with respect to the output energy of the solar power generating section, the output DC energy provided by the power generator of this example still had an intensity of 86.4%.

Example 6

As a sixth specific example of the present invention, a power generator was made by connecting a bridge rectifier to the output of the second antenna with the arrangement of Example 1. The bridge rectifier thus obtained achieved a DC conversion efficiency of as high as 94.1% at a resonant frequency of 3 MHz. With such a rectifier introduced, the output DC energy provided by the power generator of this example had an intensity of 87.0% with respect to the output energy of the solar power generating section.

Example 7

With the conditions of Example 6 partially modified, a power generator representing a seventh specific example of the present invention was made under the conditions including Voc=1.52 and g=15 cm. The power generator of Example 7 achieved an output voltage of 308 V and a power generation efficiency of 87.2%.

Example 8 and Comparative Example 4

A power generation system was formed as an eighth specific example of the present invention by connecting seven power generators of Example 7 in parallel with each other, thereby achieving an output voltage of 308 V and a generated power of 27.5 W. In the same way, a power generation system was formed as Comparative Example 4 by connecting 63 solar cells in series together. The following Table 2 summarizes the characteristics of Example 8 and Comparative Example 4:

TABLE 2

|  | Total number of cells used | Number of cells connected in parallel | Number of cells connected in series | Output voltage (V) | Generated power (W) |
|---|---|---|---|---|---|
| Ex. 8 | 63 | 7 | 9 | 308 | 27.5 |
| Cmp. Ex. 4 | 63 | 1 | 63 | 31.5 | 31.1 |

Although seven series of cells were connected in parallel with each other inside of the system, Example 8 achieved 9.8 times as high an output voltage as Comparative Example 4. Consequently, this Example 8 realizes a power generation system that provides the best voltage value for a DC power supply system with a working voltage of 300 V.

The present invention can reduce the installation cost of a power generator and can simplify the replacement work if a part of its power generating section has deteriorated. In addition, according to the present invention, the output voltage of the power generating section can be increased easily. That is why if the power generating section needs to be formed by connecting power generating elements (or cells) with a low output voltage in series together, the number of those power generating elements to be connected can be reduced significantly. As a result, a solar power generation system, of which the performance would be affected by partial shading to a much lesser degree and which can supply power with good stability, is provided. Likewise, the voltage step-up produced by the present invention will also result in many beneficial effects in a fuel cell system, which is a power generation system that should function as a link to pass the output energy supplied from a power generating device at a low voltage to a system with a high working voltage.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A wireless power transmission unit comprising:
    an oscillator for converting DC energy into RF energy having a frequency f0;
    a first antenna for transmitting the RF energy, the first antenna including a first inductor and a first capacitor that are connected together in series to form a series resonant circuit with a resonant frequency fT; and
    a second antenna for receiving, by resonant magnetic coupling, at least a part of the RF energy that has been transmitted by the first antenna, the second antenna including a second inductor and a second capacitor that are connected in parallel with each other to form a parallel resonant circuit with a resonant frequency fR, wherein the resonant frequencies fT and fR are set to be substantially equal to the frequency f0 of the RF energy,
the oscillator has a voltage step-up ratio Voc,
the first inductor has an inductance L1,
the second inductor has an inductance L2,
the second inductor is coupled with the first inductor by a resonant magnetic field at a coupling coefficient k which is set to be less than 0.5, and
the power transmission unit satisfies $(L2/L1) \geq 4(k/Voc)^2$.

2. A power generator comprising:
a power generating section for outputting DC energy; and
a wireless power transmission unit, which is connected to the power generating section,
wherein the wireless power transmission unit includes:
an oscillator for converting the DC energy into RF energy having a frequency f0;
a first antenna for transmitting the RF energy, the first antenna including a first inductor and a first capacitor that are connected together in series to form a series resonant circuit with a resonant frequency fT; and
a second antenna for receiving, by resonant magnetic coupling, at least a part of the RF energy that has been transmitted by the first antenna, the second antenna including a second inductor and a second capacitor that are connected in parallel with each other to form a parallel resonant circuit with a resonant frequency fR,
wherein the resonant frequencies fT and fR are set to be substantially equal to the frequency f0 of the RF energy,
the oscillator has a voltage step-up ratio Voc,
the first inductor has an inductance L1,
the second inductor has an inductance L2,
the second inductor is coupled with the first inductor by a resonant magnetic field at a coupling coefficient k which is set to be less than 0.5, and
the power generator satisfies $(L2/L1) \geq 4(k/Voc)^2$.

3. The power generator of claim 2, wherein the power generating section is a solar power generating section.

4. The power generator of claim 3, wherein the solar power generating section uses crystalline silicon.

5. The power generator of claim 2, wherein when an output terminal of the second antenna is connected to a load that follows the second antenna, the output impedance Zoc of the oscillator and the input impedance Zin of the first antenna are substantially equal.

6. The power generator of claim 2, wherein when an output terminal of the oscillator is connected to an input terminal of the first antenna, the output impedance Zout of the second antenna is substantially equal to the input impedance of a load that follows the second antenna.

7. The power generator of claim 2, wherein $(L2/L1) \geq 100 \times (k/Voc)^2$ is satisfied.

8. The power generator of claim 2, wherein $(L2/L1) \geq 10000 \times (k/Voc)^2$ is satisfied.

9. The power generator of claim 2, wherein the power generating section and the first antenna are arranged outside of a building, and
wherein the second antenna is installed inside of the building.

10. The power generator of claim 2, wherein the first and second inductors both have an air-core spiral structure.

11. The power generator of claim 2, wherein L1<L2 is satisfied.

12. The power generator of claim 2, wherein the number N2 of turns of the second inductor is greater than the number N1 of turns of the first inductor.

13. The power generator of claim 2, wherein the area of the second inductor is larger than an area of the first inductor.

14. The power generator of claim 13, wherein when the second inductor is projected onto the plane of the first inductor, the first inductor is included within an area defined by the projected profile of the second inductor.

15. The power generator of claim 13, wherein when the second inductor is projected onto the plane of the first inductor, the first inductor is located close to the periphery of an area defined by the projected profile of the second inductor.

16. A wireless power transmission unit comprising:
an oscillator for converting DC energy into RF energy having a frequency f0;
a first antenna for transmitting the RF energy, the first antenna including a first inductor and a first capacitor that are connected together in series to form a series resonant circuit with a resonant frequency fT;
a second antenna for receiving, by resonant magnetic coupling, at least a part of the RF energy that has been transmitted by the first antenna, the second antenna including a second inductor and a second capacitor that are connected in parallel with each other to form a parallel resonant circuit with a resonant frequency fR; and
a rectifier for converting the RF energy supplied from the second antenna into DC energy,
wherein the resonant frequencies fT and fR are set to be substantially equal to the frequency f0 of the RF energy,
the oscillator has a voltage step-up ratio Voc,
the rectifier has a voltage step-up ratio Vrr,
the first inductor has an inductance L1,
the second inductor has an inductance L2,
the second inductor is coupled with the first inductor by a resonant magnetic field at a coupling coefficient k which is set to be less than 0.5, and
the power transmission unit satisfies $(L2/L1) \geq 4(k/(Voc \times Vrr))^2$.

17. A power generator comprising:
a power generating section for outputting DC energy; and
a wireless power transmission unit, which is connected to the power generating section,
wherein the wireless power transmission unit includes:
an oscillator for converting the DC energy into RF energy having a frequency f0;
a first antenna for sending out the RF energy, the first antenna including a first inductor and a first capacitor that are connected together in series to form a series resonant circuit with a resonant frequency fT;
a second antenna for receiving, by resonant magnetic coupling, at least a part of the RF energy that has been transmitted by the first antenna, the second antenna including a second inductor and a second capacitor that are connected in parallel with each other to form a parallel resonant circuit with a resonant frequency fR; and
a rectifier for converting the RF energy supplied from the second antenna into DC energy,
wherein the resonant frequencies fT and fR are set to be substantially equal to the frequency f0 of the RF energy,
the oscillator has a voltage step-up ratio Voc,
the rectifier has a voltage step-up ratio Vrr,
the first inductor has an inductance L1,
the second inductor has an inductance L2,
the second inductor is coupled with the first inductor by a resonant magnetic field at a coupling coefficient k which is set to be less than 0.5, and
the power generator satisfies $(L2/L1) \geq 4(k/(Voc \times Vrr))^2$.

18. The power generator of claim 17, wherein the power generating section is a solar power generating section.

19. The power generator of claim 17, wherein when an output terminal of the rectifier is connected to a load that follows the rectifier, the output impedance Zoc of the oscillator and the input impedance Zin of the first antenna are substantially equal.

20. The power generator of claim 17, wherein when an output terminal of the oscillator is connected to an input terminal of the first antenna, the output impedance Zout of the rectifier is substantially equal to the input impedance of a load that follows the rectifier.

21. The power generator of claim 17, wherein $(L2/L1) \geq 100 \times (k/(Voc \times Vrr))^2$ is satisfied.

22. The power generator of claim 17, wherein $(L2/L1) \geq 2304 \times (k/Voc)^2$ is satisfied.

23. The power generator of claim 17, wherein $(L2/L1) \geq 10000 \times (k/Voc)^2$ is satisfied.

24. The power generator of claim 17, wherein the rectifier is a voltage doubler rectifier circuit with a voltage step-up ratio Vrr of at least two.

25. A power generation system comprising a number of power generators,
   wherein in at least two of the power generators, their output terminals are connected in parallel with each other, and
   wherein the at least two power generators are as defined by claim 17.

* * * * *